Nov. 13, 1934.  L. G. KNAPP  1,980,412
WHEEL
Filed May 2, 1932
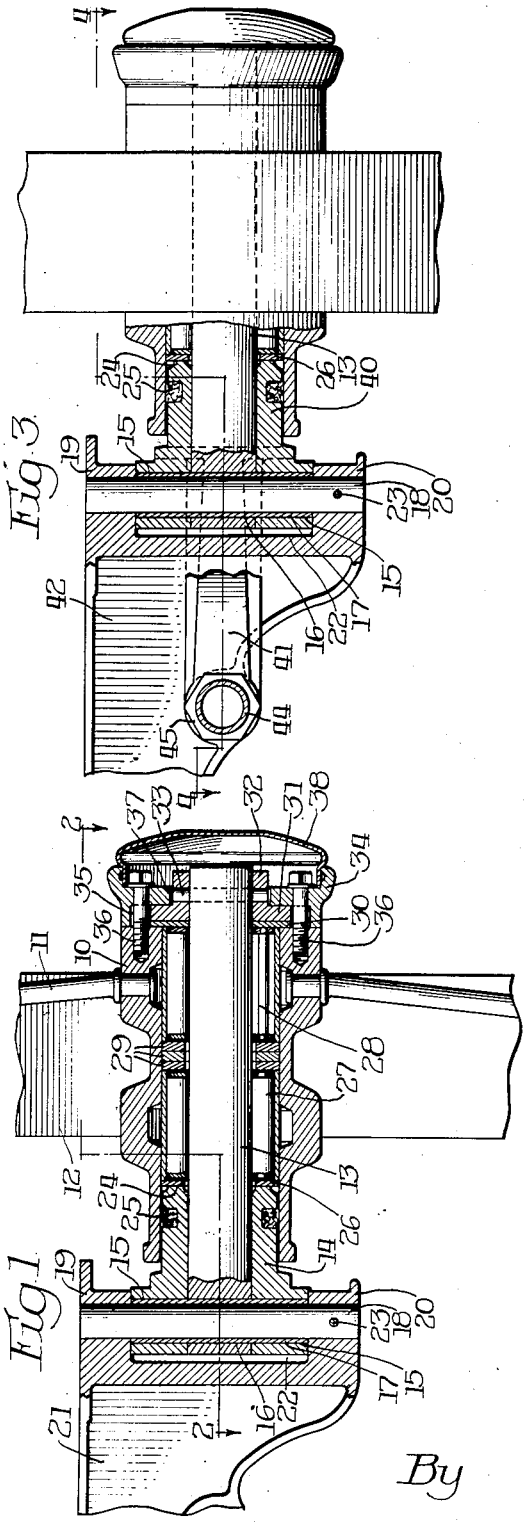
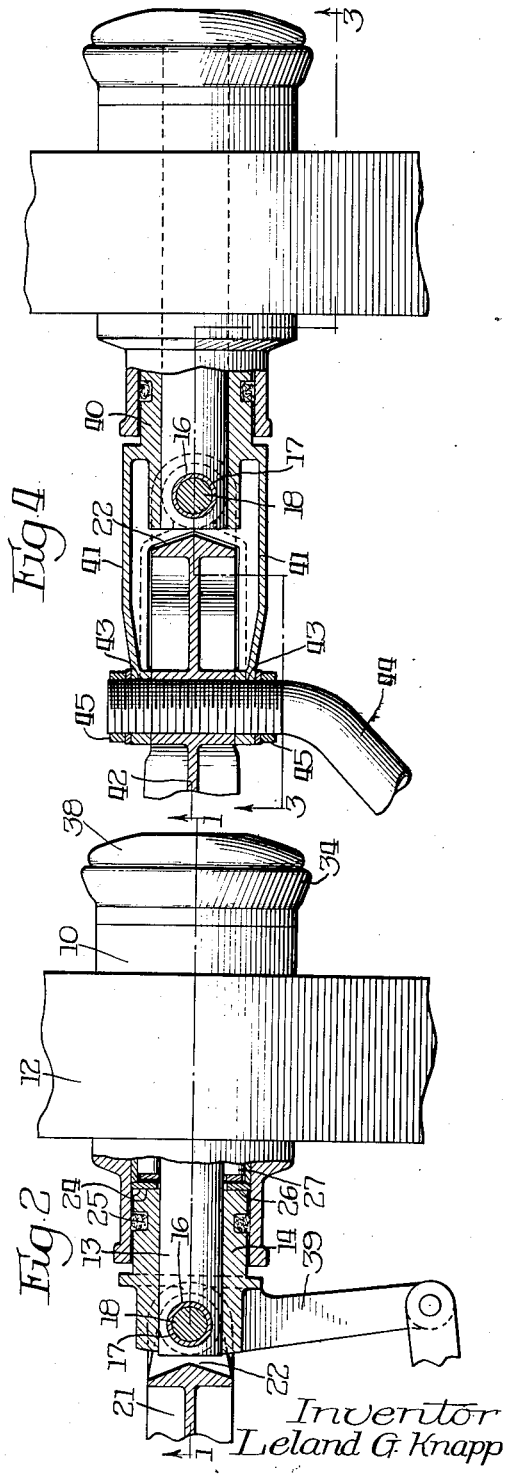
Inventor
Leland G. Knapp
By
Attys Patented Nov. 13, 1934

1,980,412

UNITED STATES PATENT OFFICE 1,980,412

WHEEL

Leland G. Knapp, Chicago, Ill., assignor to Montgomery Ward & Co., Incorporated, Chicago, Ill., a corporation of Illinois Application May 2, 1932, Serial No. 608,706

10 Claims. (Cl. 308—210)

The present invention relates to wheel constructions for use in wagons and trucks, and while adaptable for general application, the same is intended primarily for incorporation in the novel farm truck made the subject of an application for Letters Patent of the United States filed by me concurrently herewith.

The object of the invention is to provide a novel arrangement of wheel and bearing therefor the parts of which are of such form and so organized as to constitute a unitary assembly to be shipped with the other parts of a wagon or truck, and to be readily connected to the bolsters thereof by the purchaser of the wagon or truck without the exercise of special skill.

Furthermore, the invention also aims to provide a wheel construction of such form and arrangement that the parts thereof may be shipped in knock-down condition, rather than assembled if this be not desired, the purchaser being enabled to set up the construction and associate the parts in operative relation with convenience and ease, and without the use of special tools.

The invention also contemplates a wheel construction having a simplified embodiment of anti-friction bearings, whereby to insure free and easy running of the wheel without liability of derangement of the bearings, and with easy access to the latter for repair or replacement should occasion for the same arise.

Other objects and advantages of the invention will appear as the nature of the improvements is better understood, the invention consisting substantially in the novel construction, combination and arrangement of parts hereinafter fully decribed, illustrated in the accompanying drawing, and finally pointed out in the appended claims.

The form of the invention made the basis of the present disclosure is believed to be a preferred embodiment thereof, but this is susceptible to change, modification and variation, and the disclosure, therefore, is to be considered from the illustrative standpoint rather than imposing restriction or limitation on the invention.

In the drawing,

Fig. 1 is a longitudinal sectional view of a wheel hub and its axle spindle embodying the present invention, as on the line 1—1, Fig. 2;

Fig. 2 is a sectional plan view thereof, the sectional illustration being fragmentary, as on the line 2—2, Fig. 1;

Fig. 3 is a view similar to Fig. 1, as on the line 3—3, Fig. 4, the structure illustrated in Fig. 3 being an adaptation of the invention for a non-steering axle;

Fig. 4 is a sectional plan view of the structure shown in Fig. 3, the sectional illustration being fragmentary, as on the line 4—4, Fig. 3.

Referring in detail to the accompanying drawing, the numeral 10 designates the cylindrical hub of a wheel, the bore of which is of uniform diameter throughout its length; 11 the rod spokes of the wheel, and 12 the rim thereof. These parts are of metal to afford durability to the wheel and to resist the hard usage to which the wheels of farm trucks are subjected. The rod spokes 11 are upset in order to provide fixed connection of the same with the hub 10, and this form of connection also may be followed in tying the spokes into the rim 12.

Within the hub 10 an axle spindle 13 is arranged, this spindle being of uniform diameter throughout its length, but less than the diameter of the bore of the hub. The inner end of the spindle 13, or that end which is next adjacent to the truck, fits within a spindle connector 14 which is provided with perforations 15 at the upper and lower sides of the spindle 13. The spindle likewise is provided with a perforation 16 which registers with the perforations 15 of the connector, and when these perforations are aligned they receive a wear sleeve 17 which extends therethrough and surrounds a coupling pin 18. The pin 18 fits within perforated ears 19 and 20 formed at the end of a bolster 21, said bolster being provided with a vertically-disposed recess 22 which separates the perforated ears 19 and 20. The inner end of the spindle connector 14 with the spindle therein is received by the recess 22, being held therein by the coupling pin 18, which pin also is retained in the perforated ears at the end of the bolster 21 by a locking pin 23. Thus, the spindle 13 and the connector 14 are capable of rocking back and forth on the coupling pin 18 in the steering movement of the wheel.

The outer end of the spindle connector 14 has a bearing flange 24 formed thereat, and adjacent to said flange 24 the connector is also provided with a circumferential groove 25 designed to receive suitable absorbent packing by which lubricant may be held in the groove for lubricating the inner end of the hub 10, and also to prevent escape of excess quantities of the lubricant at the inner end of the hub.

A spacing washer 26 surrounds the spindle 13 and abuts against the bearing flange 24. In adjacent relation to the spacing washer 26 is located an inner roller bearing 27 of appropriate construction, including a plurality of rollers fitted in a suitable cage, the rollers being in contact with the spindle 13 so as to have proper bearing thereon and rolling contact therewith, and said inner bearing 27 has its inward thrust in the direction of the length of the spindle 13 taken up by the washer 26. An outer roller bearing 28 also surrounds the spindle 13, being in construction similar to the bearing 27, and said bearings are separated to the required extent by a plurality of spacing washers 29 interposed between said bearings and surrounding the spindle 13.

It will be noted that the diameter of the spindle connector 14 and that of the roller bearings 27 and 28 is such that these elements fit snugly within the bore of the hub 10, thereby affording an even bearing for the hub 10 throughout its length.

At the outer end of the hub 10, and bearing against its face and against the outer bearing 28, is a spacing washer 30, said washer constituting a thrust bearing to take up endwise outer thrust of the hub 10 and the bearing 28. The washer 30 is held in position on the spindle 13 and against the hub 10 by a fastening collar 31 fitted to the outer end of the spindle 13, and of greater diameter than the diameter of the bore of the hub, so as to overlap the face of the hub and prevent outward displacement of the latter from the spindle. The fastening collar 31 has a reduced hub 32 formed thereon, said hub being perforated and having fitted therein a locking pin 33 which also passes through the outer end of the spindle 13 so as to hold the fastening collar 31 in engagement with the spindle.

A clamping collar 34, the inner face of which is recessed, as at 35, is fitted over the fastening collar 31, the recess 35 receiving the fastening collar, and said clamping collar 34 is held in detachable engagement with the outer end of the hub 10 by a series of lag bolts 36 which pass through the clamping collar 34 and threadably engage the hub 10. The clamping collar 34 has a central opening 37 which receives the reduced hub 32 and fits thereover, and in this engagement of the clamping collar 34 with the fastening collar 31, the hub 10 of the wheel is held against inward movement along the spindle 13.

A hub cap 38 of appropriate form and construction is detachably engaged with the outer face of the clamping collar 34 for the purpose of covering this collar, the fastening collar 31, and the outer end of the spindle 13.

The construction illustrated in Figs. 1 and 2 adapts the invention for application to the steering wheels of a truck or wagon designed to turn on a short radius. The invention also is applicable to non-steering axles, and its adaptation to this purpose is illustrated in Figs. 3 and 4. While the spindle connector 14, illustrated in Figs. 1 and 2, is formed with a steering arm 39, thus permitting the spindle 13 to be rocked to and fro in the movement of the steering wheels, the connector 40 employed with the construction illustrated in Figs. 3 and 4, has a pair of parallel spaced inwardly-extending arms 41, said arms being spaced apart a sufficient distance to accommodate therebetween the web of a bolster 42, which may be the rear bolster of the truck or wagon, as distinguished from the bolster 21, which may be the front bolster of such truck or wagon. The arms 41 are formed with aligned eyes 43 which fit over and receive the end of a hound strut 44 to which the eyes are fastened by suitable nuts 45, or their equivalent. In other respects, the spindle connector 40 is of the same construction as the spindle connector 14, the means for connecting the spindle to the bolster 42 being the same as such connecting means employed in the adaptation of the invention illustrated in Figs. 1 and 2.

The axle spindles with their connectors may be assembled with the wheel hub and shipped with the latter from the factory to be applied by the purchaser of the truck or wagon to the respective bolsters of the latter. This application contemplates only the introduction of the ends of the spindles and their connectors to the vertical spaces at the ends of the bolsters, the coupling pins 18 being applied to the parts in order to fix the spindles in position on the bolsters. If this be not desired, the several parts may be shipped in knock-down condition, assembly thereof being effected by the purchaser, the application of the spindles to their connectors, and the application of the roller bearings, spacing washers, fastening and clamping collars to the spindles and hubs being obvious.

I claim:

1. In a wheel, the combination with the hub thereof, and a spindle therefor, of a spindle connector fitted at the inner end of the hub and in which the spindle also is fitted, anti-friction bearings surrounding the spindle and interposed between the latter and the hub, said spindle connector constituting a thrust bearing for the anti-friction bearings in one direction, a fastening collar arranged at the outer end of the spindle and engaging the end of the hub, said fastening collar constituting a thrust bearing for the anti-friction bearings in an opposite direction to the direction aforesaid, and means associated with the hub and engaging the fastening collar for preventing longitudinal movement of the hub with respect to the spindle.

2. In a wheel, the combination with the hub thereof, and a spindle therefor, of a spindle connector fitted at the inner end of the hub and in which the spindle also is fitted, anti-friction bearings surrounding the spindle and interposed between the latter and the hub, said spindle connector constituting a thrust bearing for the anti-friction bearings in one direction, a fastening collar arranged at the outer end of the spindle and engaging the end of the hub, said fastening collar constituting a thrust bearing for the anti-friction bearings in an opposite direction to the direction aforesaid, and a clamping collar detachably connected with the hub and engaging the face of the fastening collar for preventing longitudinal movement of the hub with respect to the spindle.

3. In a wheel, the combination with the hub thereof, and a spindle therefor, of a spindle connector fitted at the inner end of the hub and in which the spindle also is fitted, anti-friction bearings surrounding the spindle and interposed between the latter and the hub, said spindle connector constituting a thrust bearing for the anti-friction bearings in one direction, a fastening collar arranged at the outer end of the spindle and engaging the end of the hub, said fastening collar constituting a thrust bearing for the anti-friction bearings in an opposite direction to the direction aforesaid, a clamping collar having a recess in which the fastening collar is located and to which the fastening collar is fitted, and means for detachably engaging the clamping collar with the hub, whereby the clamping collar and the fastening collar serve to prevent separation of the hub and the spindle.

4. In a wheel, the combination with the hub thereof, and a spindle therefor, of a spindle connector fitted at the inner end of the hub and in which the spindle also is fitted, anti-friction bearings surrounding the spindle and interposed between the latter and the hub, said spindle connector constituting a thrust bearing for the anti-friction bearings in one direction, a fastening collar arranged at the outer end of the spindle and engaging the end of the hub, said fastening collar constituting a thrust bearing for the anti-friction bearings in an opposite direction to the direction aforesaid, a clamping collar surrounding the fastening collar and provided at its inner face with a recess in which the fastening collar is located, and means for detachably engaging the clamping collar with the hub, whereby the clamping collar and the fastening collar serve to prevent separation of the hub and the spindle.

5. In a wheel, the combination with the hub thereof, and a spindle therefor, of a thrust bearing associated with the spindle and located at the inner end of the hub, anti-friction bearings surrounding the spindle and interposed between the latter and the hub, said thrust bearing serving to take up end thrust of the anti-friction bearings in one direction, a fastening collar arranged at the outer end of the spindle and engaging the end of the hub, said fastening collar constituting a thrust bearing for the anti-friction bearings to take up end thrust thereof in an opposite direction to the direction aforesaid, and means associated with the hub and engaging the fastening collar for preventing longitudinal movement of the hub with respect to the spindle.

6. In a wheel, the combination with the hub thereof, and a spindle therefor, of a thrust bearing associated with the spindle and located at the inner end of the hub, anti-friction bearings surrounding the spindle and interposed between the latter and the hub, said thrust bearing serving to take up end thrust of the anti-friction bearings in one direction, a fastening collar arranged at the outer end of the spindle and engaging the hub, said fastening collar constituting a thrust bearing for the anti-friction bearings to take up end thrust thereof in an opposite direction to the direction aforesaid, and a clamping collar detachably connected with the hub and engaging the fastening collar for preventing longitudinal movement of the hub with respect to the spindle.

7. In a wheel, the combination with the hub thereof, and a spindle therefor, of a thrust bearing associated with the spindle and located at the inner end of the hub, anti-friction bearings surrounding the spindle and interposed between the latter and the hub, said thrust bearing serving to take up end thrust of the anti-friction bearings in one direction, a fastening collar arranged at the outer end of the spindle and engaging the hub, said fastening collar constituting a thrust bearing for the anti-friction bearings to take up end thrust thereof in an opposite direction to the direction aforesaid, a clamping collar having a recess in which the fastening collar is located and to which the fastening collar is fitted, and means for detachably engaging the clamping collar with the hub, whereby the clamping collar and the fastening collar serve to prevent separation of the hub and the spindle.

8. In a wheel, the combination with the hub thereof, and a spindle therefor, of a thrust bearing associated with the spindle and located at the inner end of the hub, an inner series of anti-friction bearings arranged adjacent to said thrust bearing and surrounding the spindle between the latter and the hub, an outer series of anti-friction bearings surrounding the spindle between the latter and the hub, spacing means between said inner and outer series of anti-friction bearings, a fastening collar arranged at the outer end of the spindle and engaging the hub, said fastening collar constituting a thrust bearing for the anti-friction bearings to take up end thrust thereof in an opposite direction to that taken up by the thrust bearing at the inner end of the hub, and means associated with the hub and engaging the fastening collar for preventing longitudinal movement of the hub with respect to the spindle.

9. In a wheel, the combination with the hub thereof, and a spindle therefor, of a thrust bearing associated with the spindle and located at the inner end of the hub, an inner series of anti-friction bearings arranged adjacent to said thrust bearing and surrounding the spindle between the latter and the hub, an outer series of anti-friction bearings surrounding the spindle between the latter and the hub, spacing means between said inner and outer series of anti-friction bearings, a fastening collar arranged at the outer end of the spindle and engaging the hub, said fastening collar constituting a thrust bearing for the anti-friction bearings to take up end thrust thereof in an opposite direction to that taken up by the thrust bearing at the inner end of the hub, and a clamping collar detachably connected with the hub and engaging the fastening collar for preventing longitudinal movement of the hub with respect to the spindle.

10. In a wheel, the combination with the hub thereof, and a spindle therefor, of a thrust bearing associated with the spindle and located at the inner end of the hub, an inner series of anti-friction bearings arranged adjacent to said thrust bearing and surrounding the spindle between the latter and the hub, an outer series of anti-friction bearings surrounding the spindle between the latter and the hub, spacing means between said inner and outer series of anti-friction bearings, a fastening collar arranged at the outer end of the spindle and engaging the hub, said fastening collar constituting a thrust bearing for the anti-friction bearings to take up end thrust thereof in an opposite direction to that taken up by the thrust bearing at the inner end of the hub, a clamping collar surrounding the fastening collar and provided at its inner face with a recess in which the fastening collar is located, and means for detachably engaging the clamping collar with the hub, whereby the clamping collar and the fastening collar serve to prevent separation of the hub and the spindle.

LELAND G. KNAPP.

CERTIFICATE OF CORRECTION.

Patent No. 1,980,412.  November 13, 1934.

LELAND G. KNAPP.

It is hereby certified that error appears in the above numbered patent requiring correction as follows: In the signature to the drawing, after "By" insert the name of the attorneys of record Cromwell, Greist & Warden; and that the said Letters Patent should be read with this correction therein that the same may conform to the record of the case in the Patent Office.

Signed and sealed this 5th day of February, A. D. 1935.

Leslie Frazer (Seal)  Acting Commissioner of Patents.